United States Patent
Tillotson

(10) Patent No.: US 9,736,433 B2
(45) Date of Patent: Aug. 15, 2017

(54) SYSTEMS AND METHODS FOR DETECTION OF CLEAR AIR TURBULENCE

(71) Applicant: The Boeing Company, Chicago, IL (US)

(72) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 805 days.

(21) Appl. No.: 13/897,068

(22) Filed: May 17, 2013

(65) Prior Publication Data

US 2014/0340481 A1 Nov. 20, 2014

(51) Int. Cl.
*H04N 7/18* (2006.01)
*G01W 1/10* (2006.01)
*G01W 1/00* (2006.01)

(52) U.S. Cl.
CPC .............. *H04N 7/18* (2013.01); *G01W 1/10* (2013.01); *G01W 2001/003* (2013.01)

(58) Field of Classification Search
USPC ......................................................... 348/144
See application file for complete search history.

(56) References Cited

U.S. PATENT DOCUMENTS

| | | | |
|---|---|---|---|
| 5,602,543 A * | 2/1997 | Prata et al. .................... | 340/968 |
| 7,343,793 B2 | 3/2008 | Tillotson et al. | |
| 7,530,266 B2 | 5/2009 | Tillotson et al. | |
| 7,592,955 B2 * | 9/2009 | Tillotson et al. ............. | 342/378 |
| 7,598,901 B2 * | 10/2009 | Tillotson et al. ........... | 342/26 B |
| 7,686,253 B2 | 3/2010 | Lewis et al. | |
| 7,874,522 B2 | 1/2011 | Lewis et al. | |
| 7,880,666 B2 | 2/2011 | Tillotson et al. | |
| 7,889,328 B2 * | 2/2011 | Tillotson ......................... | 356/28 |
| 8,174,431 B2 | 5/2012 | Tillotson et al. | |
| 8,320,630 B2 | 11/2012 | Tillotson | |
| 8,339,583 B2 | 12/2012 | Tillotson | |
| 8,345,115 B2 | 1/2013 | Tillotson | |
| 8,376,284 B2 | 2/2013 | Lewis et al. | |
| 8,605,983 B2 * | 12/2013 | Weston et al. ................ | 382/141 |

(Continued)

FOREIGN PATENT DOCUMENTS

GB 2471952 1/2011

OTHER PUBLICATIONS

Savchenko, et al., "On the Angular Structure of the Brightness of Light Pillars Produced by Ground-Based Point Structures During Snowfalls," Atmospheric and Oceanic Optics, vol. 23, No. 2, Apr. 2010, pp. 125-127.
European Search Report for EP14162485.8-1555.

*Primary Examiner* — Leron Beck
(74) *Attorney, Agent, or Firm* — Joseph M. Butscher; The Small Patent Law Group, LLC

(57) ABSTRACT

Systems and methods for detection of clear air turbulence are provided. One system includes an image capture device suitable to capture one or more images of an optical phenomenon caused by non-horizontally oriented ice crystals. The system also includes a computer processor configured to receive the one or more images from the image capture device, analyze the one or more images by comparing one or more characteristics of the one or more images to one or more threshold values, and determine based on the comparing, an occurrence of clear air turbulence.

20 Claims, 7 Drawing Sheets

(56) References Cited

U.S. PATENT DOCUMENTS

| | | | |
|---|---|---|---|
| 2006/0085129 A1* | 4/2006 | Belenkii et al. | 701/222 |
| 2007/0286461 A1* | 12/2007 | Deforest | 382/103 |
| 2009/0310118 A1* | 12/2009 | Halldorsson | 356/28 |
| 2010/0066750 A1* | 3/2010 | Yu | H04L 67/38 345/581 |
| 2011/0013016 A1* | 1/2011 | Tillotson | 348/135 |
| 2011/0025868 A1* | 2/2011 | Tillotson | 348/222.1 |
| 2011/0085698 A1* | 4/2011 | Tillotson | 382/103 |
| 2012/0045090 A1* | 2/2012 | Bobbitt et al. | 382/103 |
| 2012/0259549 A1* | 10/2012 | McDonald | 702/3 |
| 2013/0038866 A1* | 2/2013 | Kren et al. | 356/237.5 |
| 2013/0087708 A1 | 4/2013 | Tillotson | |

\* cited by examiner

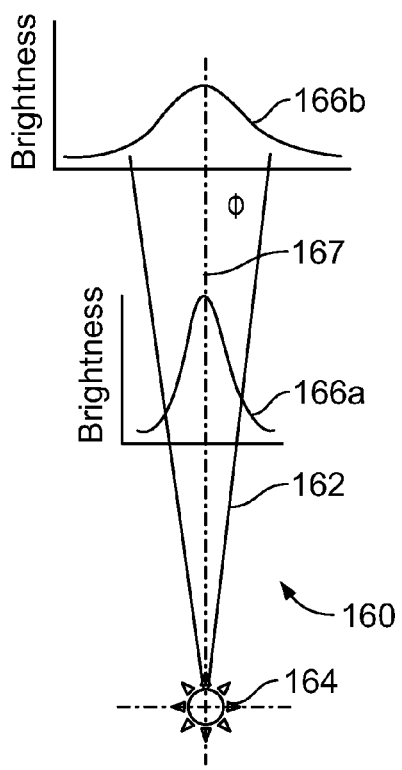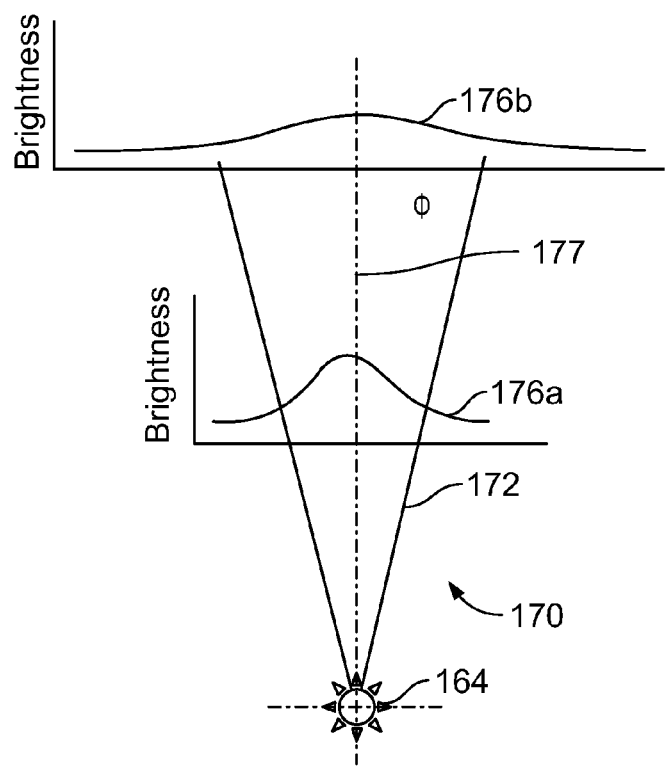
FIG. 5          FIG. 6

SYSTEMS AND METHODS FOR DETECTION OF CLEAR AIR TURBULENCE

BACKGROUND

The present disclosure relates generally to systems and methods for estimating the magnitude and distance of turbulent pockets of air.

Clear air turbulence is turbulence that results where there are no clouds, precipitation, or visible particles such as dust in the air. When an aircraft encounters clear air turbulence at cruising altitudes, serious injury to occupants in the aircraft may result.

Clear air turbulence is difficult to forecast and even more difficult to detect with conventional methods. For example, some conventional methods use weather forecasts, pilot reports, accelerometer measurements, radar measurements, laser radar measurements, acoustic measurements, global positioning system (GPS) scintillation measurements and/or optical measurements to estimate or predict clear air turbulence. However, these methods can suffer from not adequately estimating or predicting the clear air turbulence under some conditions, such as not accurately predicting air turbulence in clear air. Thus, with current systems and methods, clear air turbulence is difficult to forecast and almost impossible to detect.

SUMMARY

In accordance with one embodiment, a system to detect clear air turbulence (CAT) is provided that includes an image capture device suitable to capture one or more images of an optical phenomenon caused by non-horizontally oriented ice crystals. The system also includes a computer processor configured to receive the one or more images from the image capture device, analyze the one or more images by comparing one or more characteristics of the one or more images to one or more threshold values, and determine based on the comparing, an occurrence of clear air turbulence.

In accordance with another embodiment, a method for detecting clear air turbulence is provided. The method includes receiving from an image capture device mounted to an air vehicle one or more images of an optical phenomenon caused by non-horizontally oriented ice crystals, analyzing with a computer processor the one or more images by comparing the one or more characteristics of the one or more images to one or more threshold values, and determining based on the comparing, using a computer processor, an occurrence of clear air turbulence.

In accordance with yet another embodiment, an air vehicle is provided that includes an airframe and an image capture device mounted to the airframe and suitable to capture one or more images of an optical phenomenon caused by non-horizontally oriented ice crystals. The air vehicle also includes a computer processor configured to receive the one or more images from the image capture device, analyze the one or more images by comparing one or more characteristics of the one or more images to one or more threshold values, and determine based on the comparing, an occurrence of clear air turbulence.

The features and functions discussed herein can be achieved independently in various embodiments or may be combined in yet other embodiments, further details of which can be seen with reference to the following description and drawings.

BRIEF DESCRIPTION OF THE DRAWINGS

FIG. 5 is an illustration of a narrow light pillar analyzed by a clear air disturbance detection system in accordance with one embodiment.

FIG. 6 is an illustration of a wide light pillar analyzed by a clear air disturbance detection system in accordance with one embodiment.

DETAILED DESCRIPTION

Figure 1:
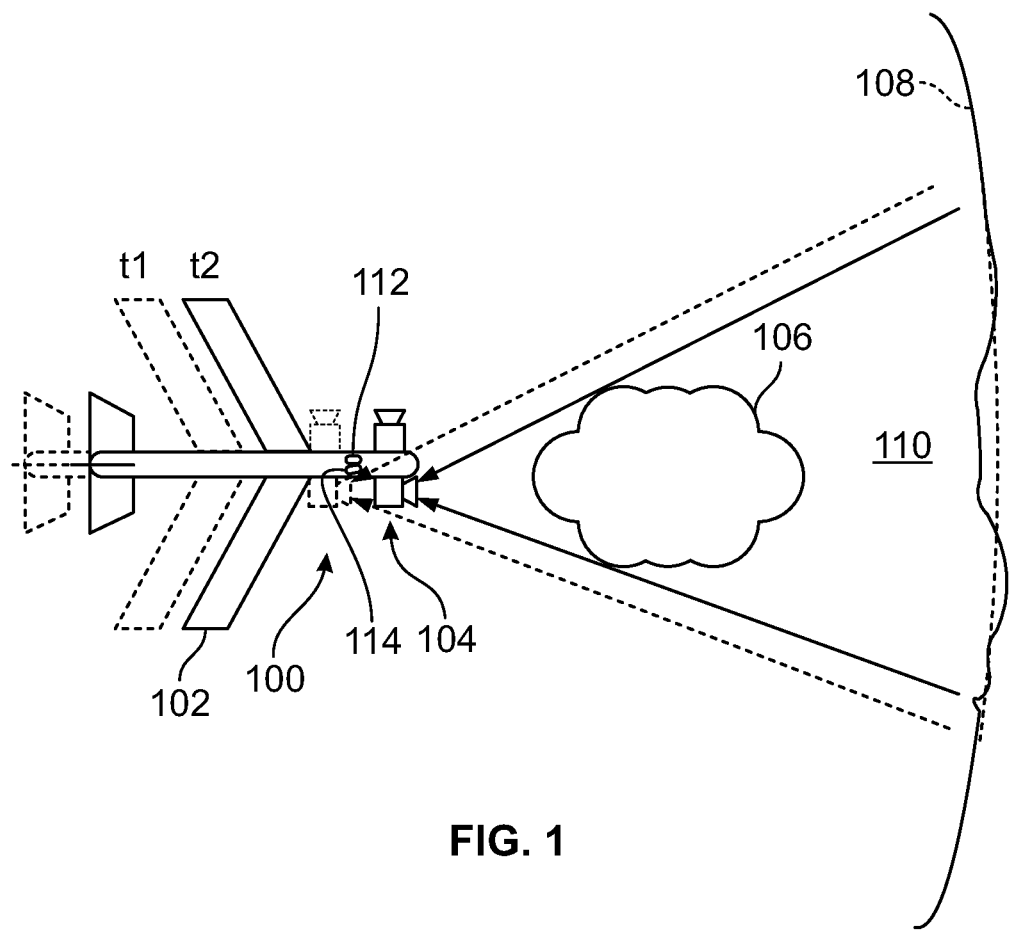
FIG. 1 is an illustration of an air vehicle having a clear air disturbance detection system in accordance with one embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide methods and systems for clear air disturbance detection, including systems and methods for estimating the magnitude and distance of turbulent pockets of air. In some embodiments, clear air disturbance is detected under a number of different conditions using an image capture device (e.g., camera). For example, some embodiments detect clear air turbulence against a featureless or relatively featureless visual background. By predicting or detecting clear air turbulences, a pilot may, for example, turn on the "seat belt required" light and/or slow the aircraft speed.

A clear air turbulence detection system in accordance with various embodiments detects turbulence in the atmosphere and enables pilots to maneuver an aircraft to avoid any turbulent pockets of air. In one embodiment, the clear air turbulence detection system warns the pilot of turbulence in the path of the aircraft. In another embodiment, the clear air turbulence detection system provides a visual navigational aid to enable a pilot to navigate around pockets of turbulent air. The clear air turbulence detection system may improve air safety, allowing airplanes to fly at cruise speeds with a reduced risk of running into unexpected turbulence that could damage the airplane or harm passengers. The clear air turbulence detection system also may increase the comfort of passengers in the airplane by allowing the pilot to navigate around pockets of turbulence or, if the turbulence is widespread, by allowing the pilot to slow the airplane and navigate through the least turbulent areas of the sky. Further, reducing the amount of turbulence that an airplane flies through over the airplane's useful life may also reduce the stresses on airframe and engine components that accrue during a lifetime of continuous operation. This will reduce component fatigue, permit safer long term operation of the aircraft, and reduce or shorten necessary maintenance cycles.

Referring now to FIG. 1, the clear air turbulence detection system 100 comprises one or more image captured devices, illustrated as cameras 104 (two cameras 104 are shown in FIG. 1), such as video cameras, mounted on, to, or in an aircraft 102, and a processor 112 or other processing machine for analyzing images from the cameras 104. The processor 112 may be any suitable system capable of processing images, including but not limited to a PC or a circuit board having a processor. The camera 104 is communicatively coupled to the computer which receives images from the camera 104. In one embodiment, the camera 104 uses a telephoto lens, such as a long-focus lens in which the physical length of the lens is shorter than the focal length. In operation, the camera 104 is pointed approximately at the horizon 108, and one or more images or video is acquired and transmitted to the processor 112. The camera 104 in some embodiments outputs digitized data of the image to the processor 112. In other embodiments, the processor 112 digitizes an analog signal from the camera 104 into digital images using, for example, a digital frame grabber. It should be noted that the image capture device of various embodiments may be any type of device capable of acquiring or capturing one or more images.

Light arriving at the camera 104 from the horizon 108 that passes through a pocket of turbulence 106 will be reflected differently than light passing through the rest of the sky and affects certain optical phenomena in the sky. The difference in reflection is due to certain characteristics of ice crystals as described herein that are indicative of pockets of turbulence 106. As a result of light reflection and certain optical phenomena, there will be distorted portions of the optical phenomena (e.g., light pillars), such as making these optical phenomena broader and less intense.

In various embodiments, the camera(s) 104 mounted on, to, or in the aircraft 102, provide continuous or periodic image data to the processor 112 that analyzes the scene imaged by the camera(s) 104. It should be noted that although the camera 104 is illustrated as oriented to point toward the horizon, such that one camera 104 is facing forward relative to the aircraft 102, in some embodiments, optionally or alternatively, a camera 104 may be facing to the side (e.g., transverse to the forward facing camera 104). The camera(s) 104 in some embodiments may operate in the infrared instead of, or in addition to, the visible wavelengths. If the camera 104 includes infrared capability or image intensifiers, then various embodiments may operate in dark or low light conditions, for example, used at dusk or night as well as in the daytime. The camera 104 with infrared capability also may selectively use an image intensifier, such as a night vision tube. It should be noted that the camera 104 may be mounted to, on, or in different types of air vehicles, or for example, a weather balloon (not shown) capable of flying at or near typical airliner cruise altitudes.

In operation, the processor 112 processes a one or more image frames from the camera(s) 104. When no turbulence 106 is present in the field of view 110, there are no changed characteristics in the optical phenomena (e.g., no changes in light pillars from a bright light source). When turbulence 106 is present, however, some parts of the image including the optical phenomena will appear changed or distorted, and the change or distortion may be identified using various embodiments. As described in more detail herein, in various embodiments, the processor 112 detects and measures the changed characteristics in the optical phenomena to infer the presence of clear air turbulence.

It should be noted that typically, the reflective scattering of light by ice crystals in natural turbulence varies less than 10 milliradians relative to scattering in stable air and may therefore be too small to be measured by many cameras using normal snapshot lenses. In various embodiments, the camera(s) 104 in the clear air turbulence detection system 100 uses a telephoto lens having a long focal length that magnifies the image and provides a suitable resolution for imaging by the camera 104. In one embodiment, the telephoto lens and the pixel resolution of the image capturing element, for example a CCD chip, are adapted to optically resolve at least 100 microradians of angle. For example, a telephoto lens having a 100 millimeter focal length can optically resolve approximately $10^{-4}$ radians when coupled with a one cm$^2$ CCD chip having 10-micron pixels arranged in a 1000×1000 pixel matrix. In one embodiment, the telephoto lens is a zoom lens, capable of adjusting the magnification and therefore allowing the system operator to selectively trade off measurement accuracy for a wider field of view.

In various embodiments, the camera 104 includes a CCD having a very fine pitch, or a comparable image capturing means, and is used to gather an image, either alone or in combination with a telephoto lens. In one embodiment, to increase or maximize the resolution, the CCD is a monochrome CCD. Color CCDs generally use small filters arranged in a pattern over the CCD elements, which can cause unwanted image artifacts such as color changes near sharp edges of object depending upon how the light falls onto the CCD chip. Edge artifacts are unwanted image distortions that have the potential of being misinterpreted by the processor 112 as turbulence. In other embodiments, the system uses a 3-CCD camera 104 which divides the image into three different CCDs, for example using dichroic filters or partially silvered mirrors, and therefore does not induce unwanted edge artifacts. Thus, it should be noted, however, that the camera 104 may be different types of devices, such as a monochrome camera, a color camera, a still camera, or a video camera (each of which may include one or more polarizing filters), among others.

In some embodiments, the camera 104 is a digital camera, a video camera, a high-resolution CCD camera, or an HD camcorder. In various embodiments, to enhance the image depth and dynamic range of the captured image, the camera 104 selectively uses filters, such as a polarization filter, a neutral density filter, and/or a red filter to avoid scattered blue light.

More particularly, the camera 104 may be a monochrome camera or a color camera, or a monochrome camera with interchangeable color filters. It should be noted that distinguishing short wavelength colors such as blue from the long wavelength colors such as red is beneficial. When using a color camera, the various embodiments exploit the following: (a) that Rayleigh scattering from small objects such as air molecules and aerosols get stronger with the reciprocal of the fourth power of the wavelength of light, but (b) specular scattering from the surfaces of ice crystals (typically hundreds of wavelengths in size) is largely independent of wavelengths. Therefore, light scattered from the open sky is strongly blue, but light reflected from ice crystals has a spectrum similar to that of the sun. In some embodiments, the processor 112 subtracts the intensity of blue light from the overall image intensity, which amplifies the intensity corresponding to ice crystals. This subtraction makes it easier to ascertain the brightness and width of the optical phenomena, which is calculated as described in more detail herein.

In some embodiments, the camera 104 has one or more polarizing filters, enabling the processor 112 to measure the brightness of light that is polarized perpendicular to the scattering direction. Light polarized in this direction results from single scattering (e.g., light reflected in a single bounce from an ice crystal or from an air molecule). Light polarized in other directions corresponds to multiple bounces (e.g., light reflected from the surface of the earth and then reflected from an ice crystal or air molecule). Light with multiple bounces makes it difficult to accurately measure the brightness and width of optical phenomena associated with ice crystals. The processor 112 in some embodiments subtracts the intensity of light with other polarizations from the overall image brightness, which amplifies the brightness of light from the light source scattered in a single bounce from an ice crystal.

When the camera 104 is a video camera, the processor 112 may collect multiple images in succession, align the images to each other, and add the images together (e.g., using an image pixel addition process). This increases the sensitivity to faint light and reduces sensitivity to noise. As a result, the processor 112 can detect and characterize fainter optical phenomena such as Venus pillars and Venus dogs. In cases where the light source is moving rapidly across the image, such as when the light source is a bright satellite or a distant aircraft, the processor 112 aligns the images in such a way that the light source has the same relative position in each image. The optical phenomena then appear in the same place in each image. When these images are added together, the optical phenomena get brighter and the noise gets relatively weaker.

In one embodiment, the camera 104 is mounted on a rotatable swivel mount that allows the camera 104 to be rotated to view different portions of the sky. For example, the camera 104 may be mounted on a multi-axis gimbal, allowing the camera 104 to be angularly rotated in any direction. In these embodiments, the camera 104 may be rotated or oriented in order to scan a larger area. The output from the camera 104 is synchronized with an output from a rotational encoder or other similar orientation identifying means to correlate images from the camera 104 with the orientation of the camera. The motion of the camera 104 can be associated or linked to the motion of the aircraft 102, for example through a navigation system 114 (communicatively coupled to the processor 112) such as a global positioning system (GPS) receiver, an inertial measurement unit (IMU), or both. The IMU measures changes in camera orientation due to rotation or twisting of the aircraft 102 and can be used to maintain orientation of the camera towards a desired point in the sky. In one embodiment, the motion and orientation of the camera 104 can be measured by changes in the positions of visual features in a sequence of images, and the motion and orientation measurements can be used to digitally align, or register, images to each other as if the camera 104 were stationary. In other embodiments, the camera 104 is substantially fixed and a rotatable mirror may be used to change the direction of viewing of the camera 104. In one embodiment, the mirror is a first surface mirror for better clarity. In some embodiments, the camera 104 is mounted in a vibration reducing mount. In other embodiments, the camera 104 is gyroscopically stabilized. Thus, in various embodiments, the navigation system 114 provides the processor 112 with the time, location and camera orientation at the moment each camera image is acquired by the camera 104.

In various embodiments, clear air turbulence is detected when the visual background has few sharp features, but includes a clear horizontal view of the air, such as at the horizon 108, at cruise level for the aircraft 102. This detection may include periodically or continuously monitoring the field of view 110 as the aircraft 102 cruises, such as illustrated at time t1 and t2 in FIG. 1. During flight, clear air turbulence cause distortions or changes in optical phenomena that are detected in various embodiments. It should be noted that optical phenomena as used herein generally refers to visual conditions associated with high altitude ice crystals, such as light pillars and halos that appear in known positions relative to bright objects, such as the sun, moon, bright planets, and distant artificial lights.

The processor 112 in various embodiments analyzes image data including images of optical phenomena to provide automated optical detection of distortions or changes in the optical phenomena, such as changed characteristics in the optical phenomena (e.g., size, shape or brightness). It should be noted that the processor 112 may include software (e.g., tangible, non-transitory computer readable media), hardware, or a combination thereof that perform processes or methods of one or more embodiments. For example, various embodiments may include an ephemeris (table of values that gives the positions of astronomical objects in the sky at a given time or times) from which the positions of bright celestial bodies and artificial satellites can be computed, and/or a database containing brightness and geographic locations of major artificial light sources such as cities, oil platforms, and natural gas flares.

Thus, the processor 112 in various embodiments is programmed to locate bright light sources in each image based on visual data in the image. For example, in some embodiments, the software includes an ephemeris as described herein to help locate, identify, and/or characterize bright celestial light sources like the sun, moon, planets, and/or bright satellites. The processor 112 (a) uses this information to locate a light source outside the image frame delivered by the camera and/or (b) uses the known color spectrum of a light source to help distinguish optical phenomena with that source's spectrum from other scattered light. In some embodiments, the software provides a geographic information system with information about the location, extent, color, and intensity of light sources on the ground. The processor 112 (a) uses this information to locate a light source outside the image frame delivered by the camera and/or (b) uses the known color spectrum of a light source to help distinguish optical phenomena with that source's spectrum from other scattered light.

Figure 2:
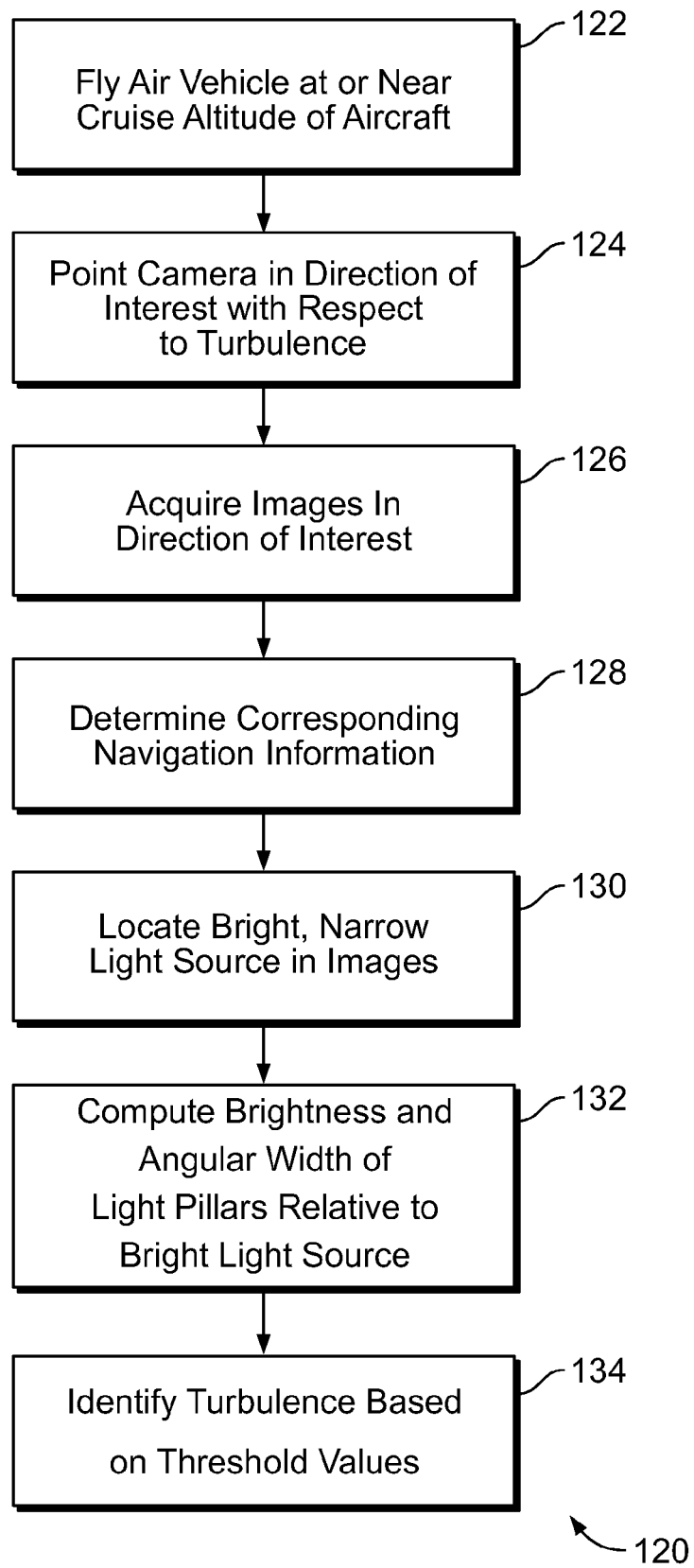
FIG. 2 is an illustration of operations for performing clear air disturbance detection in accordance with one embodiment.

A method 120 for clear air turbulence detection is shown in FIG. 2. An overall description will first be provided followed by a detailed description. In various embodiments, the method 120, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 120 generally includes at 122 flying an air vehicle at or near the cruise altitude of an aircraft, for example, an airliner. The air vehicle may be the airliner itself (such as the aircraft 102 shown in FIG. 1) or may be another airborne vehicle, such as a weather balloon (or several weather balloons at different altitudes) flying at or near and in the vicinity of the aircraft. In general, at typical cruising altitudes, a camera (e.g., the camera 104) is provided a clear view of the air (such as at the desired altitude) without distortion or obstruction by lower-altitude phenomena like clouds, dust, and smoke. Accordingly, various embodiments operate at altitudes above 20,000 feet. However, one or more embodiments may be used at altitudes lower than 20,000 feet.

The method 120 also includes pointing the camera in the direction of interest with respect to turbulence at 124. For example, in various embodiments, the camera is directed, which may be independent of the aircraft or as part of the aircraft (e.g., when the aircraft maneuvers), in the direction where information about turbulence is desired or needed (e.g., in front of the aircraft). For example, for an aircraft implementing one or more embodiments to protect the aircraft from turbulence, the camera is generally directed in the direction of flight, which may be predetermined, such as when the camera is mounted to the aircraft in a forward looking direction.

The method 120 further includes acquiring images in the direction of interest at 126 using the camera. For example, the camera may continuously or intermittently (e.g., periodically) capture images in front of the aircraft and transfer the images to a storage device and/or processor (e.g., the processor 112). In various embodiments, the camera 104 may be controlled to initiate image capture, such as after a predetermined time period after takeoff or after reaching cruising altitude. It should be noted that if the camera is a video camera, imitating image capture (turning on the video camera) commands the video camera, for example, to continuously acquire and transmit images. However, it should be noted that in various embodiments, some of the images are processed, while in other embodiments, all of the images are processed.

The method 120 includes determining corresponding navigation information at 128. For example, navigation information for the aircraft at the time(s) when images are captured is determined and stored to associate the images with the navigation information. For example, using a GPS system onboard the aircraft, time, location and orientation data may be concurrently acquired and transmitted to the storage device and/or processor. Accordingly, navigation information is available for images to be processed and used as described in more detail herein.

The method 120 also includes locating one or more weather phenomena using the acquired images, for example, identifying or locating bright, narrow light sources in the images at 130. For example, the processor is programmed in accordance with various embodiments to locate in one or more images, at least one bright, narrow light source. In some instances, the bright light source may be in the image itself, such as when the camera is facing towards a setting sun. However, in other instances, the bright light source may be outside the image (e.g., above the image frame) or the bright light source may be occluded by the air vehicle's structure or the earth, such as when the camera is facing towards a sunset after the sun has fallen below the horizon.

Figure 3:
FIG. 3 is an image of an optical phenomenon analyzed by a clear air disturbance detection system in accordance with one embodiment.

The method 120 additionally includes computing one or more characteristics or properties relative to the bright, narrow light source, which in various embodiments includes computing a brightness and angular width of light pillars relative to the bright light source (e.g., light pillars that appear adjacent to the bright light sources) at 132. For example, in some embodiments, the processor computes the brightness and angular width of light pillars above and below the bright light source. The computation may include, for example, computing a best-fit of a light pillar template (e.g., based on known light pillar geometric parameters) to one or more portions of the image above and below the bright light source as described in more detail herein. In some embodiments, a best-fit algorithm may be used to adjust two template parameters, brightness and angular width, to reduce or minimize the error between the template and the actual image. It should be noted that the light pillar includes different types of light visual phenomenon created by the reflection of light from ice crystals with near horizontal parallel planar surfaces. For example, the light can come from the sun in which case the phenomenon is called a sun pillar or solar pillar. The light can also come from the moon or from terrestrial sources (e.g., above and below the planet Venus). In general, light pillars are a kind of optical phenomenon which is formed by the reflection of sunlight or moonlight by ice crystals that are present in the earth's atmosphere. The light pillar looks like a thin column that extends vertically above and/or below the source of light. For example, the light pillar is prominently visible when the sun is low or lies below the horizon or arising from the moon. Light pillars normally form an arc that extends from five to ten degrees beyond the solar disc. For example, a light pillar 140 is shown in the image 142 of FIG. 3, which is a sun pillar extending from the sun. The bright light source is, thus, the sun and the image 142 may be captured using the camera 104.

Figure 4:
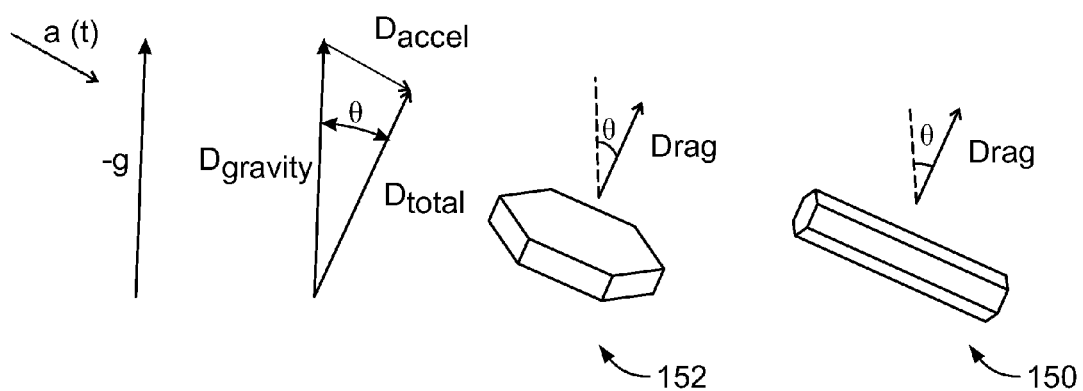
FIG. 4 is an illustration of ice crystal tilting analyzed by a clear air disturbance detection system in accordance with one embodiment.

Nearly all such phenomena occur because aerodynamic forces cause tiny, hexagonal ice crystals to orient themselves horizontally in stable air: columnar crystals orient long axes horizontally and plate crystals orient largest flat surfaces horizontally. The intensity and width of these phenomena are determined by the stability or turbulence of the air, namely, turbulence disturbs the horizontal orientation of the crystals. The crystals are so small that these crystals orient themselves nearly instantaneously to keep long axes or flat faces thereof perpendicular to the drag force. In stable air, the drag force is vertical such that the crystals are oriented horizontally. However, column crystals 150 (as shown in FIG. 4) rotate about corresponding long axes, such that the crystal 150 reflect light over a range of vertical angles, which produces apparent or putative light pillars. Flat plate crystals 152 (as shown in FIG. 4) rotate about corresponding short axes, which reflects light over a range of horizontal angles, producing a parhelic arc, and in cases where light enters the crystal and reflects internally, sun dogs.

More particularly, during turbulence, turbules of air containing ice crystals accelerate in a time-varying direction and magnitude, a(t), as shown in FIG. 4. This turbulence imposes a drag force $D_{accel}$ (a vector quantity) that is not generally aligned to the drag force resisting gravity, $D_{gravity}$. The resultant force $D_{total}$ is tilted at an angle θ relative to the vertical. Crystals, such as the crystals 150 and 152, within the turbule therefore tilt at the same angle relative to horizontal. Accordingly, turbulence accelerates air, such that the net drag vector falling on the crystals 150 and 152 is not vertical and the crystals 150 and 152 orient themselves perpendicular to the drag vector.

The method 120 also includes identifying turbulence at 134. For example, when the light pillar intensity brightness is above a first user-defined threshold value (e.g., selected to establish confidence that a light pillar is actually present) and the light pillar angular width is greater than a second user-defined threshold value (e.g., selected to correspond to a particular magnitude of turbulence), the processor identifies the imaged light phenomenon as indicative of upcoming turbulence, as described in more detail herein and may provide a warning. For example, a visual or audible warning in the cockpit or to the flight crew of the aircraft of potential clear air turbulence may be provided. However, other warnings may be provided. For example, a warning may be provided via radio to an airline fleet dispatcher or to air traffic control.

Thus, a warning may be provided to the flight crew of the aircraft. The warning may be an audio signal and/or a visual display, such as a copy of the image in which turbulence indicators were found, with an overlay to highlight the features that indicate turbulence. In some embodiments, the warning includes estimates of distance to the turbulence, intensity of the turbulence, and confidence that the turbulence exists as described in more detail herein. The intensity of the turbulence may be reported as an energy dissipation rate ($\epsilon$), as the root mean square (RMS) acceleration of air, as the RMS tilt angle of ice crystals, or other values, as described in more detail herein.

In some embodiments, the warning is provided via radio to an airline fleet dispatcher, to air traffic control, to a weather agency, or directly to other aircraft. These embodiments allow other aircraft to benefit from turbulence detected by a single aircraft. In some embodiments, observations by multiple aircraft are combined (or fused, using data fusion methods known in the art) to improve the estimated location, extent, and intensity of the turbulence.

In various embodiments, identifying the turbulence includes at least one of estimating an intensity of the turbulence or the three-dimensional location of turbulent regions, for example, the turbulence 106 (shown in FIG. 1). For example, FIG. 5 generally illustrates a small crystal tilt condition, namely one where a small tilt in the crystals 150 or 152 results in a bright, narrow visual feature. FIG. 6 illustrates a large crystal tilt condition, namely one where a large tilt in the crystals 150 or 152 results in a light pillar that is wider and dimmer.

Thus, crystals that are well aligned to the horizontal produce a narrow, bright visual feature 162 and crystals with more tilt produce a wider, less bright visual feature 172 resulting from the reflections of light from a bright object 164. In one embodiment, the intensity of pixels in a camera image is used to measure a curve 166a, 166b and/or 176a, 176b of brightness versus an angle $\phi$ relative to a vertical line 167 and/or 177 through the bright object 164. The curve 166a, 166b or 176a, 176b corresponds to the ice crystal's distribution of tilt angles. Then, using brightness as a weighting factor, the RMS tilt angle $\theta_0$ is calculated as described in more detail below.

In particular, the average tilt angle is mathematically related to turbulence intensity, wherein acceleration due to turbulence is related to turbulence intensity by the following equation:

$$a_0 = 2^{1/4} v^{-1/4} \epsilon^{3/4} \qquad \text{Equation 1}$$

where $a_0$ is the RMS magnitude of acceleration, $v$ is the kinematic viscosity (a known parameter of air which is a function of temperature and density), and $\epsilon$ is energy dissipation rate, a standard measure of turbulence intensity.

Equation 1 then may be rearranged as follows:

$$\epsilon = (a_0 2^{-1/4} v^{1/4})^{4/3} \qquad \text{Equation 2}$$

Next, the RMS acceleration of crystal-bearing air determines the ice crystal's RMS tilt angle $\theta_0$ by trigonometry according to the following:

$$\theta_0 = 3^{1/3} a_0/g \qquad \text{Equation 3}$$

where g is gravity.

Equation 3 then may be rearranged to obtain $a_0$ as follows:

$$a_0 = \theta_0 g 3^{-1/3} \qquad \text{Equation 4}$$

Thereafter, Equation 4 is substituted into Equation 2 to calculate $\epsilon$ from the measured quantity ($\theta_0$) and the computed quantity ($v$):

$$\epsilon = (\theta_0 g 3^{-1/3} 2^{-1/4} v^{1/4})^{4/3} \qquad \text{Equation 5}$$

In addition to estimating turbulence intensity, various embodiments also estimate the three-dimensional location of intense turbulent regions. In particular, two of the dimensions, namely azimuth and elevation relative to the camera, can be computed from the location on the camera focal plane, the orientation of the camera, and the focal length of the camera lens. The third dimension, range, may be computed as described below based on a localized region of the turbulence forming a bulge 180 (illustrated as a wider region or bump in FIG. 7) wherein the azimuthal width (in particular the slope of the azimuthal width as a function of elevation angle) increases and then decreases. Thus, a localized region of intense turbulence forms the bulge 180 in the light pillar 182.

Figure 7:
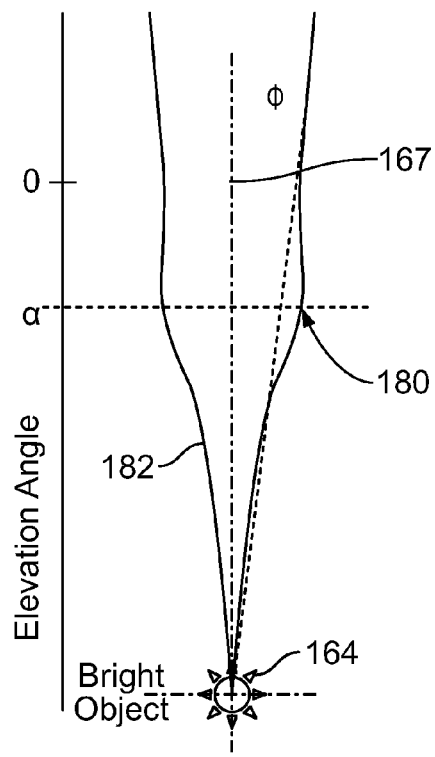
FIG. 7 is an illustration of a bulge in a light pillar analyzed by a clear air disturbance detection system in accordance with one embodiment.

In particular, regions of strong turbulence are typically localized. A region of relatively intense turbulence appears as a wider bulge 180 in a visual feature such as the light pillar 182 as shown in FIG. 7, which shows the bulge 180 in the pillar 182 above the bright object 164. It should be noted that light pillars also occur below the bright object 164, wherein bulges may appear in a lower pillar as well, or in features such as sun dogs or parhelic arcs. It should be noted that the bulge 180 is not necessarily wider in azimuth angle than any other part of the pillar 182, but the bulge 180 is wider in terms of the angle $\phi$ relative to the vertical line 167 through the bright object 164. It further should be noted that the vertical axis of FIG. 7 shows elevation angle as viewed by the camera 104. In a typical case of interest to an aircraft, the bulge 180 will be seen at negative elevation angles, i.e., below zero.

Figure 8:
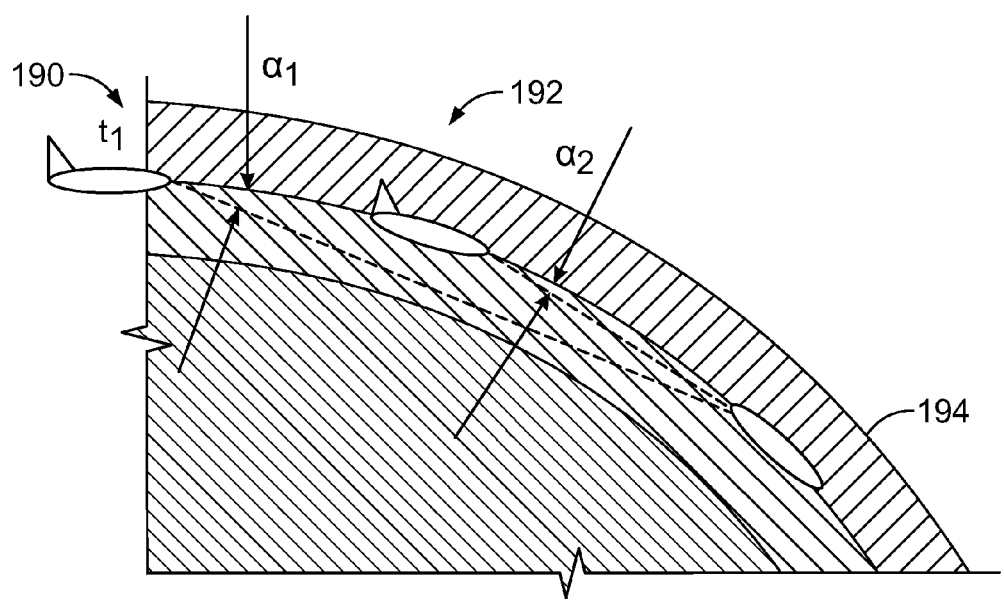
FIG. 8 is an illustration of a process for computing a turbulence range from an air vehicle in accordance with one embodiment.

In one embodiment, to compute range, the processor 112 (shown in FIG. 1) measures the elevation angle of the bulge 180 several times over a short interval (e.g., 2-15 minutes) while the airplane travels forward. Due to the curvature of the earth, the elevation angle changes as the aircraft travels. As shown in FIG. 8, the first elevation measurement taken at a known location 190 at time $t_1$ has an elevation angle of $\alpha_1$. A measurement taken at a different known location 192 at time $t_2$ has a different elevation angle $\alpha_2$. Thereafter, known trigonometric methods may be used to compute the range based on a series of such measurements.

In another embodiment, an alternative method can be used to compute range (which may be used in favorable meteorological conditions). In particular, when ice crystals are known to occur only in a narrow altitude band, e.g. from 37,000 to 38,000 feet, then a single observation of a bulge's elevation angle is sufficient to compute the range thereof. For example, in FIG. 8, if conditions are such that ice crystals only form at the same altitude as the airplane, the first elevation measurement, $\alpha_1$, suffices to compute the distance to the turbulent region 194. It should be noted that information relating to current meteorological conditions may be available or obtained via radio broadcasts, pre-flight data loads, or meteorological measurements made by the aircraft.

Figure 9:
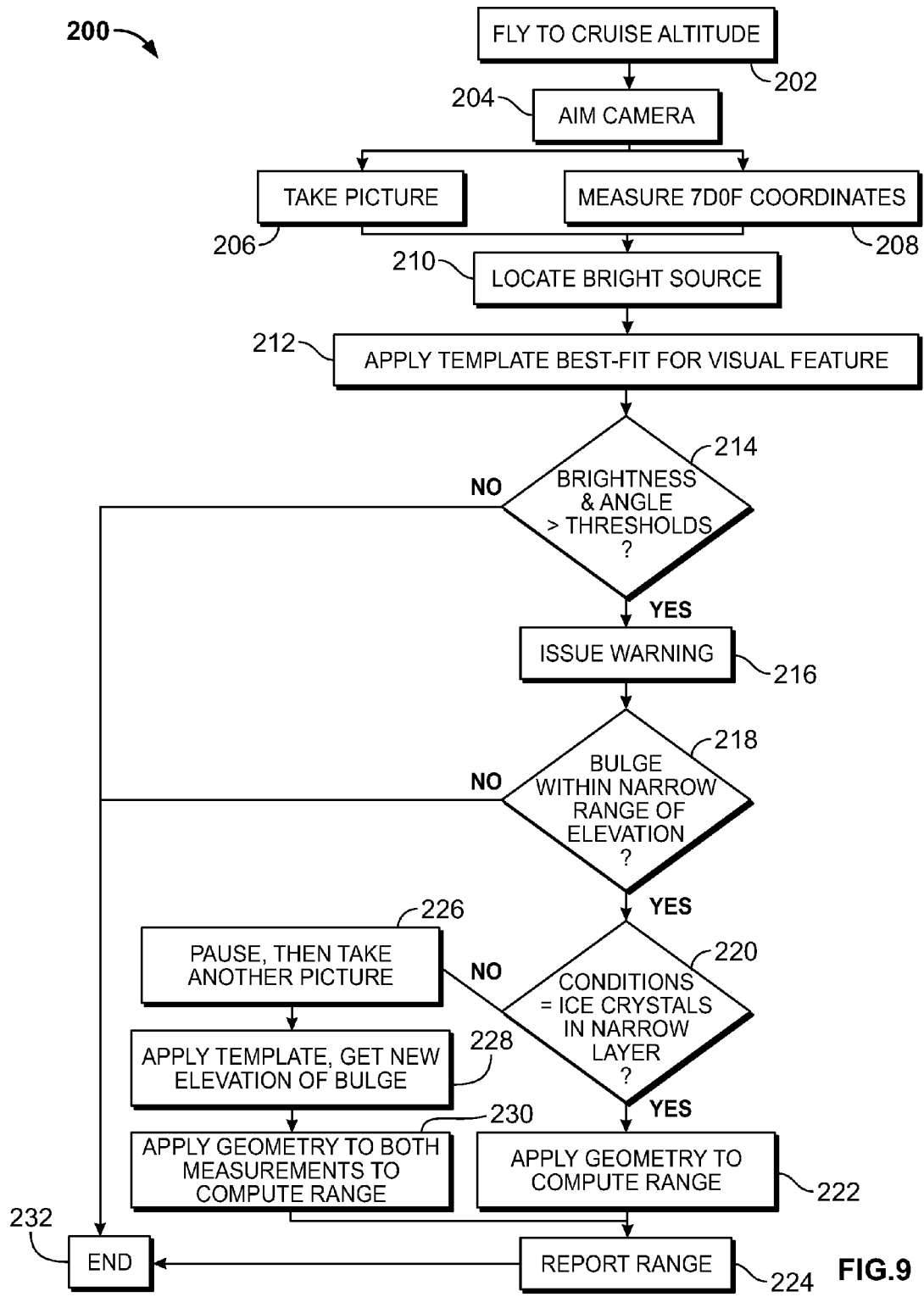
FIG. 9 is another illustration of operations for performing clear air disturbance detection in accordance with one embodiment.

FIG. 9 is a flowchart of a method 200 for identifying turbulence and providing a range estimate. In various embodiments, the method 200, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

The method 200 includes flying the air vehicle at or near a cruise altitude at 202, which may be performed similar to step 122 of FIG. 2. The camera (e.g., the camera 104 shown in FIG. 1) is aimed at 204, which may be performed similar to step 124 of FIG. 2. Thereafter, pictures are acquired at 206 and the coordinates of the air vehicle are determined at 208. It should be noted that in various embodiments, steps 206 and 208 are performed concurrently and may performed similar to steps 126 and 128, respectively of FIG. 2.

The method 200 then includes applying a template best-fit for the visual feature at 212, such as a light pillar, which may be performed similar to the step 130 of FIG. 2. Additionally, the brightness and angle (e.g., angle width) of the light pillar may then be computed (which may be performed similar to step 132 of FIG. 2) and then a determination made at 214 as to whether the brightness and angle are greater than defined threshold values. If the values of the brightness and angle are greater than the threshold values then a warning may be provided at 216 (such as similarly described for step 134 of FIG. 2). However, if the values of the brightness and angle are not greater than the threshold values then the method ends at 232, which may then initiate a next camera image acquisition or processing of a next acquired image. It should be noted that the threshold values may be varied to provide different levels of confidence or likelihood that the detected phenomena is indicative of turbulence.

If values of the brightness and angle are greater than the threshold values indicating that clear air turbulence is detected, a determination is made at 218 as to whether a bulge (e.g., the bulge 180) is present within a range of elevation angles, which may be a predetermined elevation range. If no bulge is present, then the method 200 ends at 232. If a bulge is present, then the meteorological conditions under which the image currently being processed was acquired are determined at 220. For example, a user may enter the conditions or the information may be obtained from an external source as described herein. In some embodiments, a determination is made as to whether there are ice crystals in a narrow layer (e.g., within 1000 feet of altitude) and if so, then a geometric computation of the range is performed at 222 as described herein and the range reported at 224. For example, the estimated range of the upcoming clear air turbulence may be displayed in the cockpit.

If no ice crystals are likely to be found over a broad range of altitudes, then another picture is acquired at 226 (e.g., the camera may take another picture or another subsequent picture previously acquired may be obtained from memory) and the template is applied at 228 to determine a new elevation angle for the bulge. Then, a geometric computation to both measurements is performed at 230 as described herein to compute the range of the clear air disturbance and the range is reported at 224. The method 220 then ends at 232 which may then initiate a next camera image acquisition or processing of a next acquired image.

Thus, various embodiments detect clear air turbulence against a relatively featureless visual background (versus, for example, methods that use fairly strong visual features with high spatial frequency over a substantial solid angle). Various embodiments may be performed in daylight using optical phenomena associated with the sun (e.g., light or sun pillars, a sun dog, a parhelic arc, a halo, a 120° parhelion, a circumhorizontal arc, etc.) and at night using optical phenomena associated with other light sources (e.g., the moon, Venus, Jupiter, bright satellites like the International Space Station, distant aircraft, and distant cities).

Figure 10:
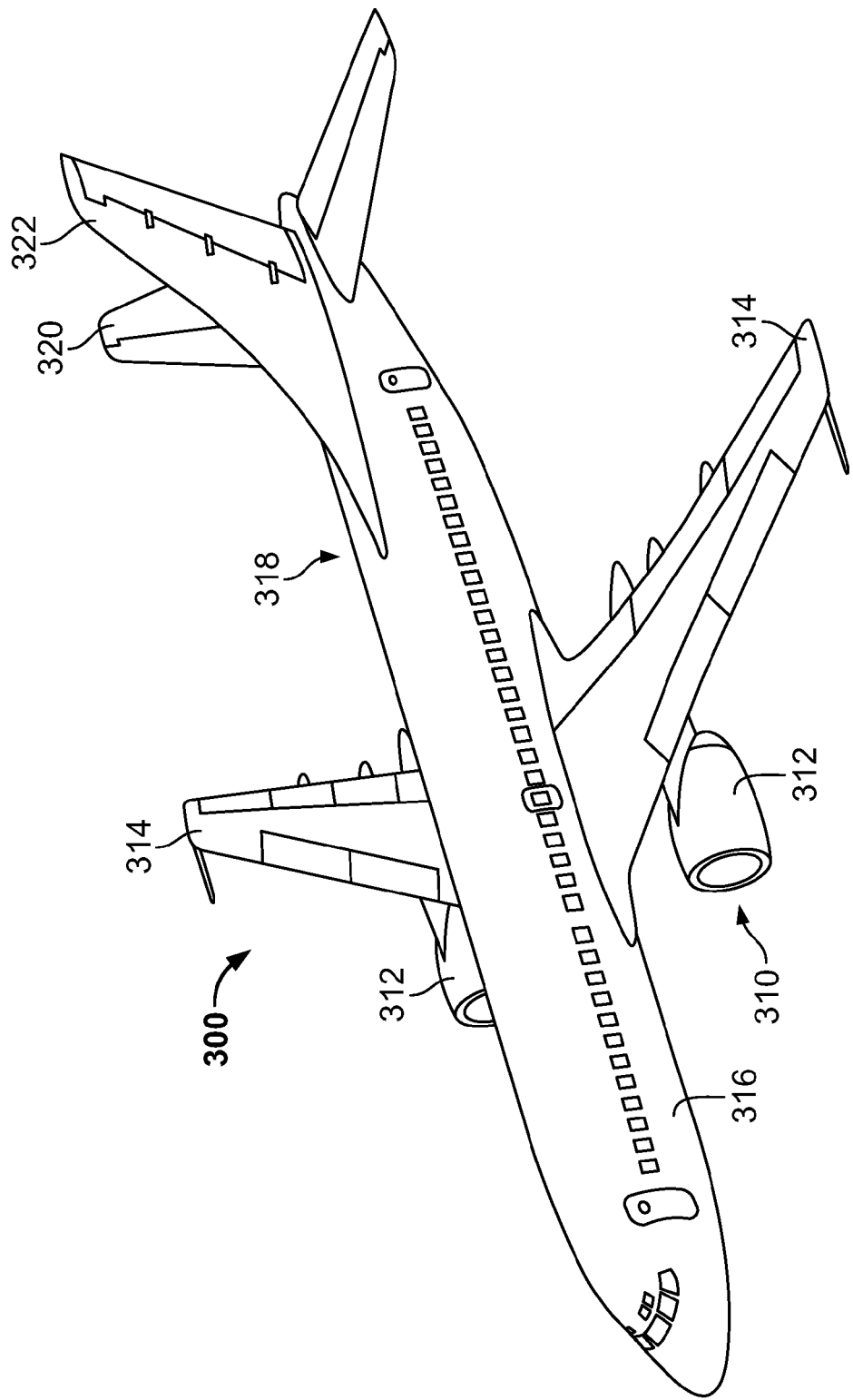
FIG. 10 is an illustration of an aircraft that may have a clear air disturbance detection system in accordance with one embodiment.

Various embodiments may be used with different types of air vehicles, such as commercial aircraft. For example, FIG. 10 illustrates an aircraft 300 that may include a system using various embodiments described above. The aircraft 300 includes a propulsion system 310 that includes two turbofan engines 312. The engines 312 are carried by the wings 314 of the aircraft 300. In other embodiments, the engines 312 may be carried by a fuselage 316 (e.g., body of the aircraft 300) and/or the empennage 318. The empennage 318 can also support horizontal stabilizers 320 and a vertical stabilizer 322. The camera 104 may be mounted to any of the components or elements of the aircraft 300.

It should be noted that the various embodiments or portions thereof, such as the systems described herein be implemented in hardware, software or a combination thereof. The various embodiments and/or components also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium.

Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A system to detect clear air turbulence (CAT), comprising:
    an image capture device suitable to capture one or more images of an optical phenomenon caused by non-horizontally oriented ice crystals; and
    a computer processor configured to receive the one or more images from the image capture device, analyze the one or more images by comparing one or more characteristics of the one or more images to one or more threshold values, and determine based on the comparing, an occurrence of clear air turbulence.

2. The system of claim 1, wherein the one or more characteristics include at least one of a brightness or angular width of a light pillar in the one or more images.

3. The system of claim 2, wherein the light pillar is formed from reflected light of a bright light source, the bright light source during daylight being the sun and at night different light sources, including one of the moon, Venus, Jupiter, bright satellites, an aircraft, or city lights.

4. The system of claim 1, further comprising an ephemeris of known light sources, and the one or more threshold values include at least one of a light intensity threshold value or an angular width value.

5. The system of claim 1, wherein the processor is further configured to produce a warning corresponding to a likely occurrence of the clear air turbulence.

6. The system of claim 1, wherein the processor is configured to estimate an intensity of the clear air turbulence at a position other than a current position of the image capture device.

7. The system of claim 1, wherein the processor is configured to estimate a three-dimensional location of the clear air turbulence using a bulge in a light pillar in the one or more images.

8. The system of claim 7, wherein the processor is configured to estimate a range to the clear air disturbance using a measured elevation angle of the bulge over a time period.

9. The system of claim 1, wherein the image capture device is one of a digital still camera or a digital video camera.

10. The system of claim 1, wherein the image capture device is mounted to an air vehicle.

11. The system of claim 1, wherein the one or more characteristics comprise a characteristic of a light pillar and the processor is further configured to use a template best-fit to identify the light pillar.

12. The system of claim 1, wherein the one or more characteristics include at least one of a brightness or angular width of a light pillar in the one or more images and the one or more threshold values define a likelihood that the one or more characteristics of the image correspond to clear air turbulence.

13. The system of claim 1, wherein the optical phenomena comprise at least one of a light pillar, a sun dog, a parhelic arc, a halo, a 120° parhelion, or a circumhorizontal arc.

14. A method for detecting clear air turbulence, the method comprising:
    receiving from an image capture device mounted to an air vehicle one or more images of an optical phenomenon caused by non-horizontally oriented ice crystals;
    analyzing with a computer processor the one or more images by comparing the one or more characteristics of the one or more images to one or more threshold values; and
    determining based on the comparing, using a computer processor, an occurrence of clear air turbulence.

15. The method of claim 14, wherein the analyzing comprises using as the one or more characteristics at least one of a brightness or angular width of a light pillar in the one or more images, wherein the light pillar is formed from reflected light of a bright light source, the bright light source during daylight being an optical phenomena associated with the sun and at night an optical phenomena associated with different light sources, including one of the moon, Venus, Jupiter, bright satellites, an aircraft, or city lights.

16. The method of claim 14, further comprising using an ephemeris of known light sources, and wherein the one or more threshold values include at least one of a light intensity threshold value or an angular width intensity value.

17. The method of claim 14, further comprising producing a warning corresponding to a likely occurrence of the clear air turbulence.

18. The method of claim 14, further comprising estimating an intensity of the clear air turbulence and a three-dimensional location of the clear air turbulence using a bulge in a light pillar in the one or more images, wherein the three-dimensional location includes an estimate of a range to the clear air disturbance using a measured elevation angle of the bulge over a time period, and using as the one or more characteristics a characteristic of a light pillar and a template best-fit to identify the light pillar.

19. An air vehicle, comprising:
an airframe;
an image capture device mounted to the airframe and suitable to capture one or more images of an optical phenomenon caused by non-horizontally oriented ice crystals; and
a computer processor configured to receive the one or more images from the image capture device, analyze the one or more images by comparing one or more characteristics of the one or more images to one or more threshold values, and determine based on the comparing, an occurrence of clear air turbulence.

20. The air vehicle of claim 19, wherein the airframe comprises a weather balloon, the image capture device mounted to the weather balloon.

\* \* \* \* \*